US008650955B2

(12) United States Patent
Swanson et al.

(10) Patent No.: US 8,650,955 B2
(45) Date of Patent: Feb. 18, 2014

(54) TIME DOMAIN SWITCHED GYROSCOPE

(75) Inventors: Paul D. Swanson, Santee, CA (US); Richard L. Waters, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 248 days.

(21) Appl. No.: 13/353,205

(22) Filed: Jan. 18, 2012

(65) Prior Publication Data

US 2013/0180333 A1 Jul. 18, 2013

(51) Int. Cl.
*G01C 19/56* (2012.01)

(52) U.S. Cl.
USPC .......................................... 73/504.12

(58) Field of Classification Search
USPC .......................................... 73/504.12, 504.02
See application file for complete search history.

(56) References Cited

U.S. PATENT DOCUMENTS 5,023,503 A 6/1991 Legge et al.
5,438,870 A * 8/1995 Zabler et al. .............. 73/504.02
6,289,733 B1 9/2001 Challoner et al.
6,674,141 B1 1/2004 Kubena et al.
6,838,806 B2 1/2005 Chua et al.
7,093,487 B2 8/2006 Mochida
7,284,429 B2 10/2007 Chaumet et al.
7,832,271 B2 11/2010 Mita et al.
8,427,249 B1 * 4/2013 Swanson et al. .............. 331/154
8,490,462 B2 * 7/2013 Swanson et al. .............. 73/1.38
2004/0217388 A1 11/2004 Kubena et al.
2010/0116630 A1 5/2010 Pinkerton
2012/0326700 A1 * 12/2012 Swanson et al. .......... 324/76.11
2013/0111990 A1 * 5/2013 Wang et al. .............. 73/504.12

* cited by examiner

*Primary Examiner* — John Chapman, Jr.
(74) *Attorney, Agent, or Firm* — Kyle Eppele; J. Eric Anderson

(57) ABSTRACT

A gyroscope comprising: a support structure; a drive mass springedly coupled to the support structure such that movement of the drive mass with respect to the support structure is substantially restricted to movement in a first direction; a driver configured to cause the drive mass to oscillate with respect to the support structure in the first direction; a sense mass springedly coupled to the drive mass such that movement of the sense mass with respect to the drive mass is substantially restricted to movement in a second direction, which is orthogonal to the first direction; and a digital trigger comprising a proximity switch coupled between the drive mass and the sense mass, wherein the switch is configured to switch from an open state to a closed state each time the sense mass is in a reference position with respect to the drive mass.

20 Claims, 8 Drawing Sheets

10
y
z
x
12
24
24
14
18
16
16
20,22
24
24

TIME DOMAIN SWITCHED GYROSCOPE

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 100992.

BACKGROUND OF THE INVENTION

The invention described and claimed herein relates to the field of detecting rotation of a structure about an axis. In particular, the claimed invention relates to the field of monolithically-integrated gyroscopes.

SUMMARY

Described herein is a gyroscope comprising: a rigid support structure, a drive mass, a drive mass driver, a sense mass, and a digital trigger. The drive mass is springedly coupled to the support structure such that movement of the drive mass with respect to the support structure is substantially restricted to movement in a first direction. The drive mass driver is configured to cause the drive mass to oscillate with respect to the support structure in the first direction. The sense mass is springedly coupled to the drive mass such that movement of the sense mass with respect to the drive mass is substantially restricted to movement in a second direction, which is orthogonal to the first direction. The digital trigger comprises a first proximity switch, which is coupled between the drive mass and the sense mass. The first switch is configured to switch from an open state to a closed state each time the sense mass is in a reference position with respect to the drive mass.

Also described herein is a monolithic gyroscope comprising: a rigid support structure, a drive mass, a drive mass driver, a sense mass, and a digital trigger. The drive mass is springedly coupled to the support structure. The drive mass driver is configured to drive the drive mass to oscillate with respect to the support structure in approximately only an x-direction. The sense mass is springedly coupled to the drive mass and is configured to move with respect to the drive mass in approximately only a z-direction, which is orthogonal to the x-direction, in response to Coriolis forces from rotation of the support structure about a y-axis, which is orthogonal to both the z- and x-directions. The digital trigger comprises a proximity switch, which is coupled between the drive mass and the sense mass and is configured to pass from an open state to a closed state when the sense mass passes through a reference position such that rotation of the support structure about the y-axis may be determined by monitoring the state of the proximity switch with respect to time.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
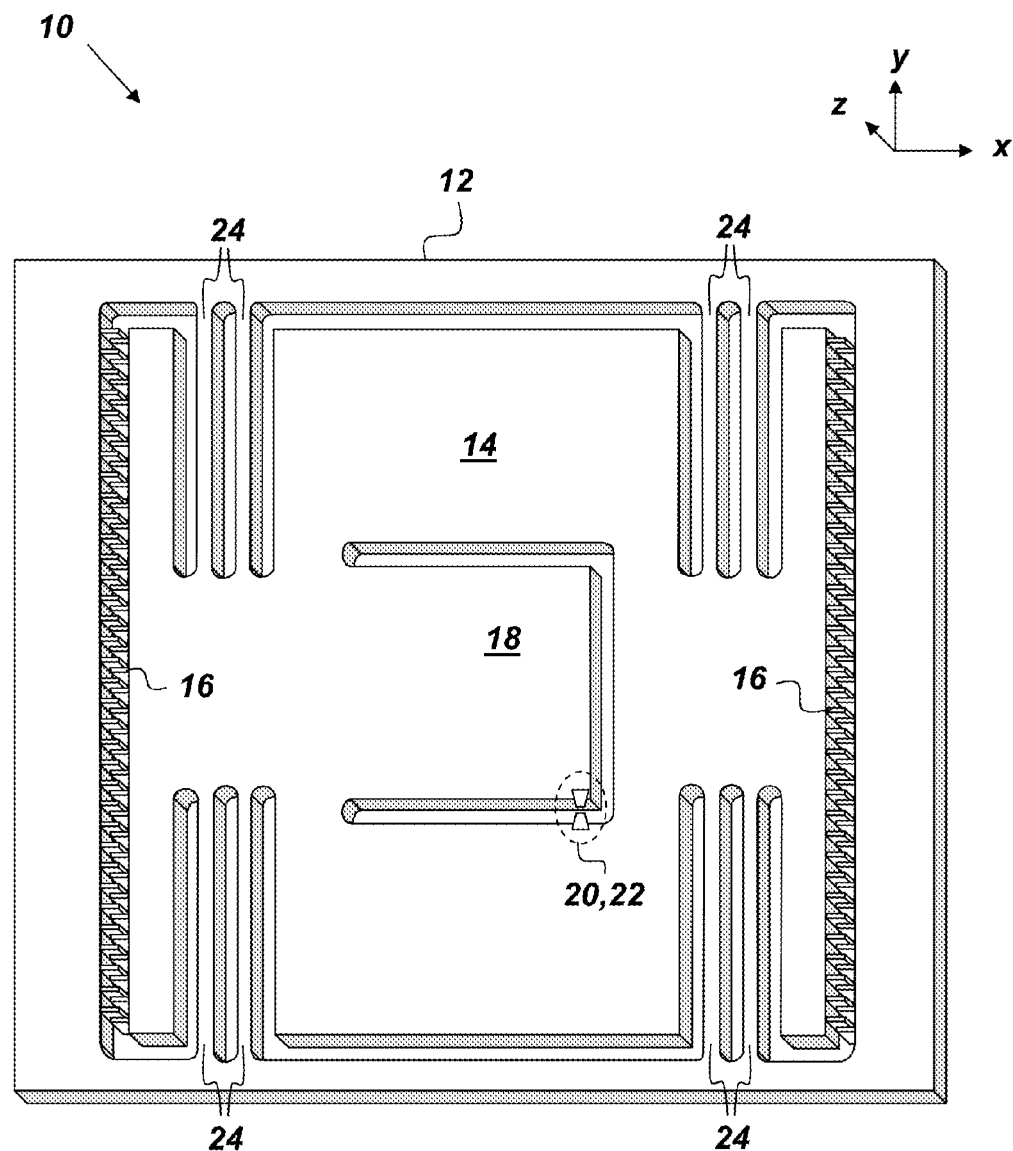
FIG. 1 is a perspective view of an embodiment of a gyroscope.

FIG. 1 is a perspective view of a time domain switched gyroscope 10. The gyroscope 10 is a vibrating-proof-mass-based gyroscope that utilizes at least one digital trigger to produce a signal each time a proof mass passes a known location. The gyroscope 10 comprises a rigid support structure 12, a drive mass 14, a drive mass driver 16, a first sense mass 18, and a first digital trigger 20. The drive mass 14 is springedly coupled to the support structure 12 such that movement of the drive mass 14 with respect to the support structure 12 is substantially restricted to movement in a first direction. In FIG. 1, the first direction corresponds to an x-direction of three, mutually-orthogonal axes x-y-z. The drive mass driver 16 is configured to cause the drive mass 14 to oscillate with respect to the support structure 12 in the x-direction. The first sense mass 18 is springedly coupled to the drive mass 14 such that movement of the first sense mass 18 with respect to the drive mass 14 is substantially restricted to movement in a second direction, which, in FIG. 1, corresponds to the z-direction. Thus, the first sense mass 18 is decoupled from the drive mass 18 in the sense direction (i.e., the z-direction). The first sense mass 18 moves in the z-direction with respect to the drive mass 14 in response to Coriolis forces from rotation of the support structure 12 about the y-axis. The first digital trigger 20 comprises a first proximity switch 22, which is coupled between the drive mass 14 and the first sense mass 18. The first proximity switch 22 passes through closed and open states with each oscillation of the first sense mass 18 with respect to the drive mass 14. Each time the first sense mass 18 passes a first reference position with respect to the drive mass 14 the first proximity switch 22 passes through a closed state. Thus, displacement from the first reference position of the first sense mass 18 with respect to the drive mass 14 may be discovered by monitoring the state of the first proximity switch 22.

The gyroscope 10 may be manufactured on any scale. For example, in one embodiment the gyroscope 10 may be monolithically integrated into a micro-electro-mechanical system (MEMS) device. The gyroscope 10 may be used in any orientation. Although the x-y-z coordinate system is depicted in the drawings and referred to herein, it is to be understood that the first, second, and third directions/axes, as used herein, may correspond to any three mutually-orthogonal directions/axes in any three-dimensional coordinate system.

The support structure 12 may be any size and shape, and be made of any material capable of providing rigid support for the gyroscope 10 such that the support structure 12 does not significantly flex and/or deform when exposed to lateral and rotational accelerations of the gyroscope 10.

The drive mass 14 may be coupled to the support structure 12 in any manner which restricts movement of the drive mass with respect to the support structure 12 in they and z-directions and rotations about the x-y-z axes, but yet allows the drive mass 14 to elastically move with respect to the support structure 12 in the x-direction. The embodiment of the gyroscope 10 shown in FIG. 1 portrays the drive mass 14 as being coupled to the support structure 12 by compliant spring members 24, which are designed to flex in only the x-direction. The drive mass driver 16 may be any apparatus capable of causing the drive mass 14 to oscillate at any desired frequency in the x-direction with respect to the support structure 12. Suitable examples of the drive mass driver 16 include, but are not limited to, variable area actuators, such as electrostatic comb drives (such as are portrayed in FIG. 1), variable gap actuators, such as parallel plate actuators, and other electro-magnetic or piezoelectric mechanisms of actuation. The drive mass 14 may be driven using a continuous oscillating force or by periodic "delta function" forces in phase with the drive mass 14 harmonic resonance.

The first sense mass 18 may be coupled to the drive mass 14 in any manner which restricts movement of the sense mass 18 with respect to the drive mass 14 in the x and y-directions and from rotating about the x-y-z axes, but yet allows the first sense mass 18 to elastically move with respect to the drive mass 14 in the z-direction. The embodiment of the gyroscope 10 shown in FIG. 1 portrays the first sense mass 18 as being coupled to the drive mass 14 by a cantilever spring which is designed to flex in only the z-direction.

The first digital trigger 20 may be any apparatus capable of producing digital signals corresponding to various positions of the first sense mass 18 with respect to the drive mass 14. The first proximity switch 22 may be any device capable of experiencing a change in state based on positional changes of the first sense mass 18 relative to the drive mass 14. The reference position in which the first proximity switch 22 is in a closed state may be a zero force position or any other desired reference position. A purpose of the first digital trigger 20 is to localize the position of the first sense mass 18 and the drive mass 14 such that an accurate acceleration-independent phase measurement can be performed—thereby increasing stability of a phased-locked loop closure and reducing overall phase noise and jitter of the gyroscope 10. In one embodiment, such as is depicted in FIG. 1, the first proximity switch 22 may be an electron tunneling switch capable of generating a finite width current pulse. In FIG. 1, the first proximity switch 22 comprises a pair of electron tunneling tips, one tip positioned on the first sense mass 18 and the other positioned on the drive mass 14. When the first sense mass is in the first reference position with respect to the drive mass 14 the tunneling tips are aligned and the first proximity switch 22 is in a closed state such that a current pulse may pass between the tips. The current pulse itself can be amplified to the rails via a transimpedance amplifier and the leading and or trailing edges of the pulse may be used to localize the position of the first sense mass 18 with respect to the drive mass 14. A more detailed description of how this can be performed may be found in U.S. patent application Ser. No. 13/276,948, titled "Resonator with Reduced Acceleration Sensitivity and Phase Noise Using Time Domain Switch," filed 19 Oct. 2011, which is incorporated by reference herein in its entirety. Other examples of the first proximity switch 22 include a capacitive switch, an optical shutter switch, and a magnetic switch. In addition, in alternate embodiments, the first proximity switch 22 may be configured to pass through multiple closed states corresponding to multiple reference positions during a single oscillation period.

Figure 2A:
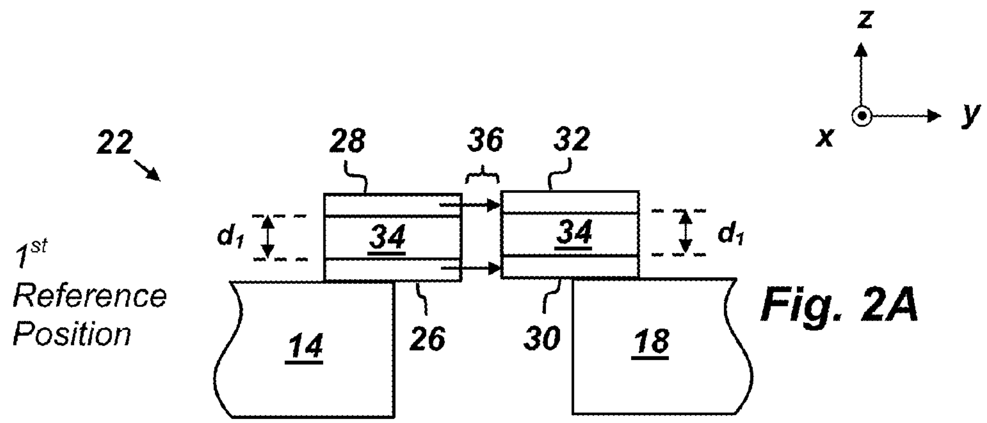
FIGS. 2A-2C are cross-sectional side views of a dual-tipped electron tunneling proximity switch in various reference positions.
Figure 2B:
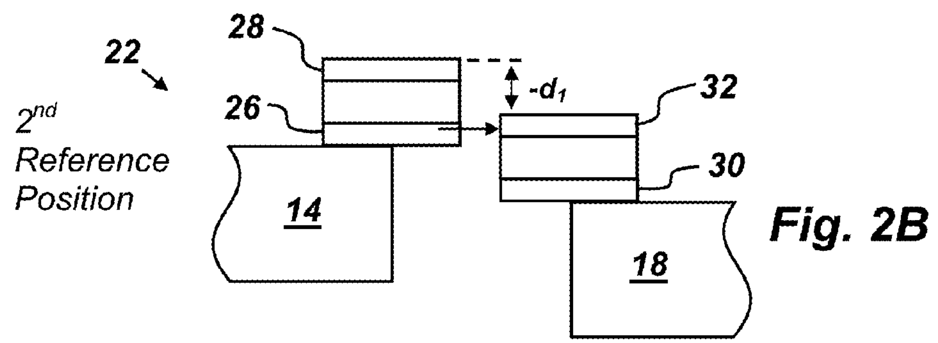
Figure 2C:
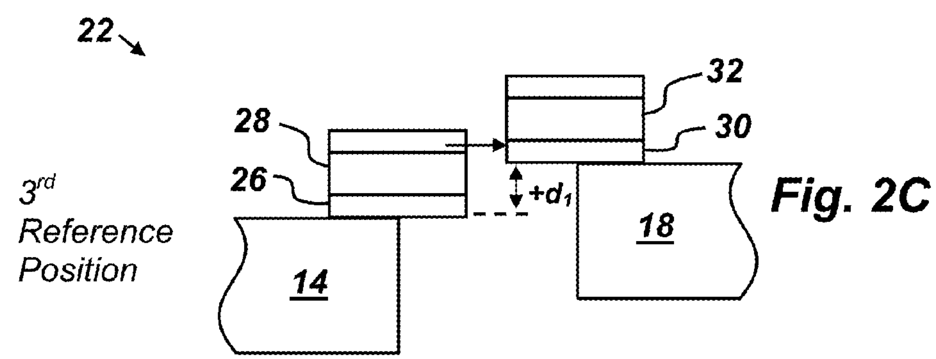

FIGS. 2A-2C illustrate an embodiment of the first proximity switch 22 where the first proximity switch 22 is configured to pass through multiple closed states corresponding to multiple reference positions of the first sense mass 18 with respect to the drive mass 14 during a single oscillation period. In the embodiment of the first proximity switch 22 shown in FIGS. 2A-2C, the first proximity switch 22 comprises first and second electron tunneling tips 26 and 28 mounted on the drive mass 14. The first and second tips 26 and 28 are aligned with each other in the z-direction and separated from each other in the z-direction by a distance $d_1$. The first proximity switch 22 in this embodiment also comprises third and forth electron tunneling tips 30 and 32 mounted to the first sense mass 18. The third and forth tips 30 and 32 are aligned with each other in the z-direction and separated from each other in the z-direction by the distance $d_1$. The first and second tips 26 and 28 and the third and fourth tips 30 and 32 can be separated from each other by a dielectric spacer 34. The first, second, third, and fourth tips 26, 28, 30, and 32 are positioned with respect to each other such that when the first sense mass 18 is in the first reference position, such as is depicted in FIG. 2A, a current pulse passes from the first and second tips 26 and 28 over a gap 36 to the third and fourth tips 30 and 32 respectively. This embodiment of the first proximity switch 22 also comprises second and third reference positions of the first sense mass 18 with respect to the drive mass 14. The first sense mass 18 is in the second reference position when the first sense mass 18 is displaced from the first reference position in the z-direction by the distance $-d_1$, such as is shown in FIG. 2B. In the second reference position, the first proximity switch 22 is in a closed state such that a current pulse may pass from the first tip 26 to the fourth tip 32. The first sense mass 18 is in the third reference position when the first sense mass 18 is displaced in the z-direction by the distance $+d_1$, such as is shown in FIG. 2C. In the third reference position, the first proximity switch 18 is in a closed state such that a current pulse passes from the second tip 28 to the third tip 30.

Figure 3:
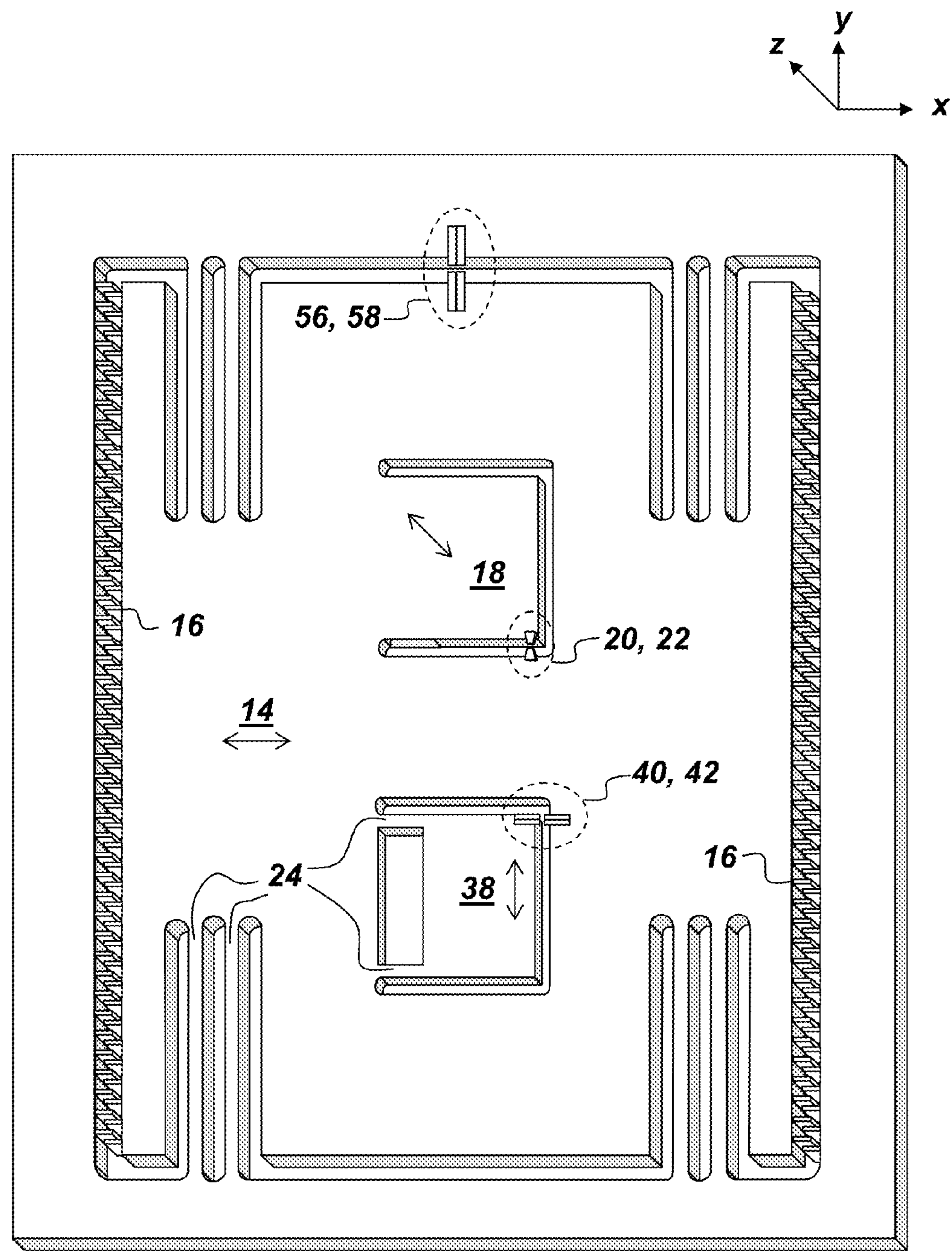
FIG. 3 is a perspective view of a dual-sense-mass embodiment of a gyroscope.

FIG. 3 is a perspective view of another embodiment of the gyroscope 10, which further comprises a second sense mass 38. The second sense mass 38 is springedly coupled to the drive mass 14 such that movement of the second sense mass 38 with respect to the drive mass 14 is substantially restricted to movement in the y-direction. Thus, the second sense mass 38 is configured to move in the y-direction with respect to the drive mass 14 in response to Coriolis forces from rotation of the support structure 12 about the z-axis. In FIG. 3, the second sense mass 38 is shown as being coupled to the drive mass 14 by compliant spring members 24. Also shown is a second digital trigger 40, which comprises a second proximity switch 42 coupled between the drive mass 14 and the second sense mass 38. The second proximity switch 42 is configured to be in a closed state each time the second sense mass 38 is in a fourth reference position with respect to the drive mass 14. The second digital trigger 40 may be any apparatus capable of producing digital signals corresponding to various positions of the second sense mass 38 with respect to the drive mass 14. The second proximity switch 42 may be any device capable of experiencing a change in state based on positional changes of the second sense mass 38 relative to the drive mass 14. In the embodiment of the gyroscope 10 depicted in FIG. 3, the second proximity switch 42 is shown as four electron tunneling tips. Further detail regarding the electron-tunneling-tip embodiment of the second proximity switch 42 may be found below in the description of FIGS. 4A-4C. The reference position in which the second proximity switch 42 is in a closed state may be a zero force position or any other desired reference position. Rotation of the support structure 12 about the z-axis may be determined by monitoring the state of the second proximity switch 42. Thus, this embodiment of the gyroscope 10 provides a gyroscope with a single drive mass and two sense masses (uncoupled in their respective sense directions) configured to measure two orthogonal rotational forces.

Figure 4A:
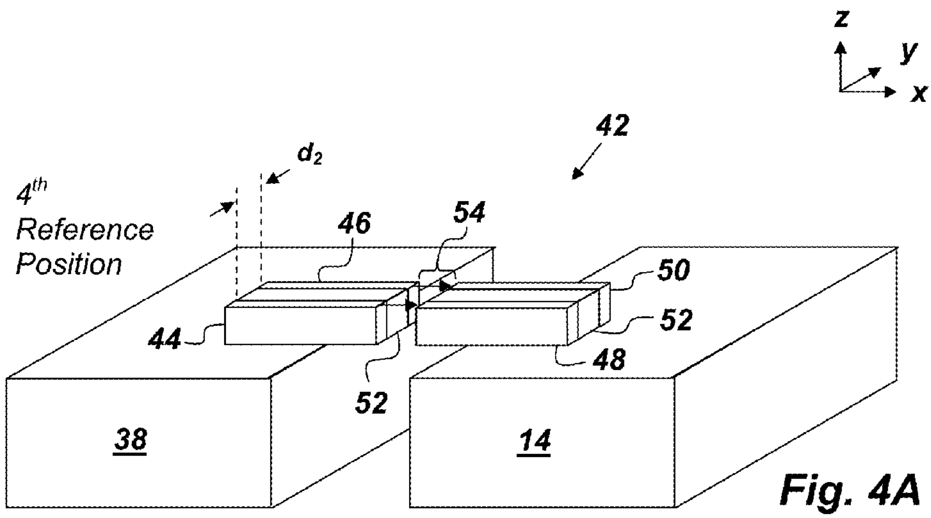
FIGS. 4A-4C are perspective views of a dual-tipped, laterally-stacked electron tunneling proximity switch in various reference positions.
Figure 4B:
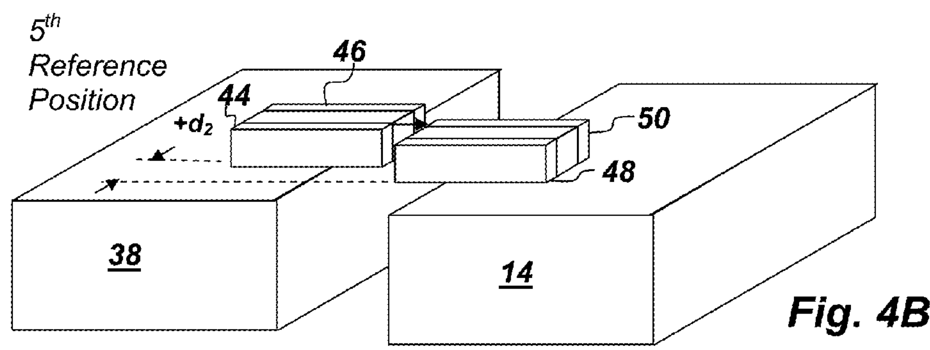
Figure 4C:
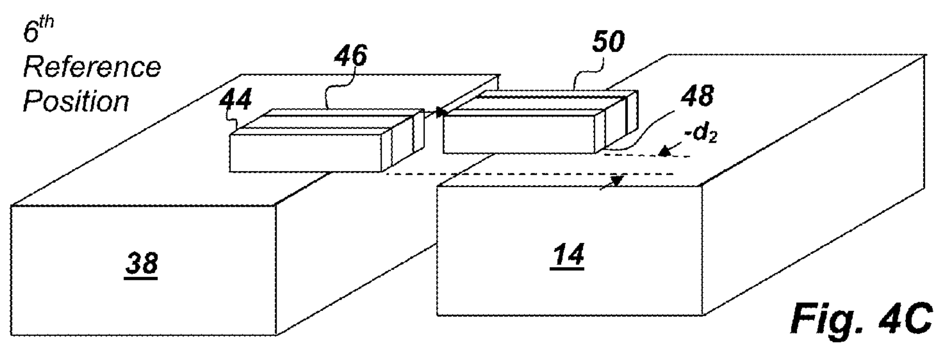

FIGS. 4A-4C are illustrations depicting the second proximity switch 42 in various reference positions of the second sense mass 38 with respect to the drive mass 14. FIG. 4A portrays the second proximity switch 42 in the fourth reference position. In the embodiment of the second proximity switch 42 shown in FIGS. 4A-4C, the second proximity switch 42 comprises fifth and sixth electron tunneling tips 44 and 46 mounted on the second sense mass 38. The fifth and sixth electron tips 44 and 46 are aligned with each other in the y-direction and separated from each other in the y-direction by a distance $d_2$. The second proximity switch 42 in this embodiment also comprises seventh and eighth electron tunneling tips 48 and 50 mounted to the drive mass 14. The seventh and eighth electron tips 48 and 50 are aligned with each other in the y-direction and separated from each other in the y-direction by a distance $d_2$. The fifth and sixth electron tips 44 and 46 and the seventh and eighth electron tips 48 and 50 can be separated from each other by a second dielectric spacer 52. The fifth, sixth, seventh, and eighth tips 44, 46, 48, and 50 are positioned with respect to each other such that when the second sense mass 38 is in the fourth reference position, such as is depicted in FIG. 4A, a current pulse passes from the fifth and sixth tips 44 and 46 over a second gap 54 to the seventh and eighth tips 48 and 50 respectively.

FIG. 4B shows the second proximity switch 42 with the second sense mass 38 in a fifth reference position. The second proximity switch 42 is in the fifth reference position when the second sense mass 38 is displaced from the fourth reference position in the y-direction by the distance $+d_2$, such as is shown in FIG. 4B. In the fifth reference position, the second proximity switch 42 is in a closed state such that a current pulse may pass from the fifth tip 44 to the eighth tip 50. The second sense mass 38 is in the seventh reference position when the second sense mass 38 is displaced in the y-direction by the distance $-d_2$, such as is shown in FIG. 4C. In the sixth reference position, the second proximity switch 42 is in a closed state such that a current pulse passes from the sixth tip 46 to the seventh tip 48. The time intervals between the fourth, fifth, and sixth reference positions may be measured to determine displacement and the amplitude of such displacement of the second sense mass 38 with respect to the drive mass 14.

Referring now back to the dual sense mass embodiment of the gyroscope 10 shown in FIG. 3, this embodiment may also comprise a third digital trigger 56 comprising a third proximity switch coupled 58 between the drive mass 14 and the support structure 12. The third switch 58 is configured to switch from an open state to at least one closed state each time the drive mass 14 passes through a reference position with respect to the support structure 12. The third proximity switch 58 functions as an accelerometer configured to detect acceleration of the support structure 12 in the x-direction. The third proximity switch 58 may be any device capable of experiencing a change in state based on positional changes of the drive mass 14 relative to the support structure 12. The reference position in which the third proximity switch 58 is in a closed state may be a zero force position or any other desired reference position.

Figure 5A:
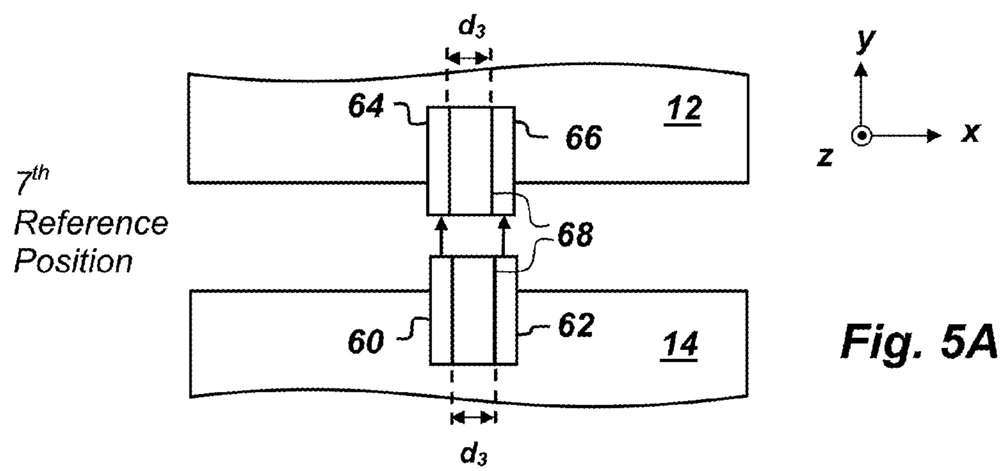
FIGS. 5A-5C are top views of another dual-tipped, laterally-stacked electron tunneling proximity switch in various reference positions.
Figure 5B:
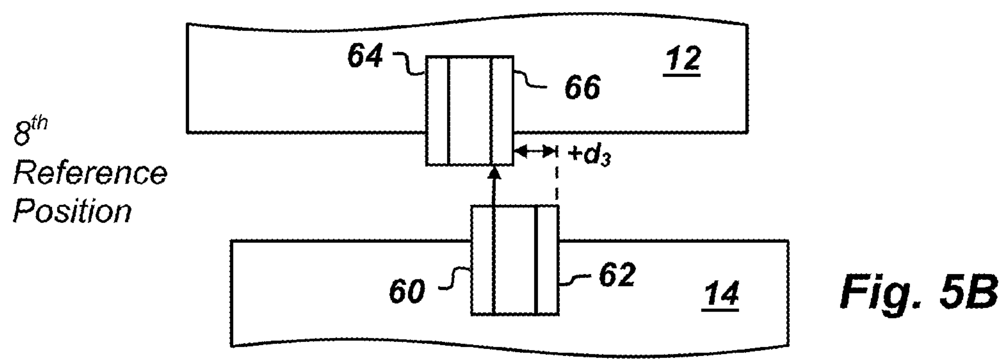
Figure 5C:
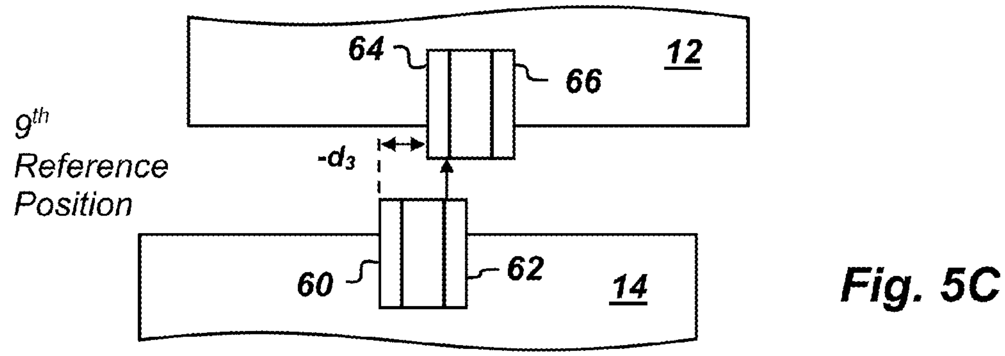

FIGS. 5A-5C are top views of the embodiment of the third proximity switch 58 depicted in FIG. 3 with the drive mass 14 in various reference positions with respect to the support structure 12. In this embodiment, the third proximity switch 58 is an electron tunneling switch capable of generating a finite width current pulse. Other examples of the third proximity switch 58 include a capacitive switch, an optical shutter switch, and a magnetic switch. In addition, the third proximity switch 58 may be configured to pass through multiple closed states corresponding to multiple reference positions during a single oscillation period. In the embodiment shown, the third proximity switch 58 comprises a pair of electron tunneling tips (ninth and tenth tips 60 and 62) positioned on the drive mass 14 and another pair of tunneling tips (eleventh and twelfth tips 64 and 66) positioned on the support structure 12. The ninth and tenth tips 60 and 62 are aligned with each other in the x-direction and are separated from each other in the x-direction by a distance $d_3$. The eleventh and twelfth tips 64 and 66 are also aligned with each other in the x-direction and separated from each other in the x-direction by the distance $d_3$. The ninth and tenth tips 60 and 62 and the eleventh and twelfth tips 64 and 66 can be separated from each other by a third dielectric spacer 68. When the drive mass 14 is in a seventh reference position with respect to the support structure 12, such as is depicted in FIG. 5A, the third switch 58 is in a closed state such that a current pulse may pass between the ninth tip 60 and the eleventh tip 64 as well as between the tenth tip 62 and the twelfth tip 66. The drive mass 14 is in an eighth reference position with respect to the support structure 12 when the drive mass 14 is displaced from the seventh reference position in the x-direction by the distance $+d_3$, such as is depicted in FIG. 5B. When the drive mass 14 is in the eighth reference position the third switch 58 is in a closed state such that a current pulse may pass between the ninth tip 60 and the twelfth tip 66. The drive mass 14 is in a ninth reference position with respect to the support structure 12 when the drive mass 14 is displaced from the seventh reference position in the x-direction by the distance $-d_3$, such as is depicted in FIG. 5C. When the drive mass 14 is in a ninth reference position with respect to the support structure 12 the third switch 58 is in a closed state such that a current pulse may pass between the tenth tip 62 and the eleventh tip 64.

Figure 6:
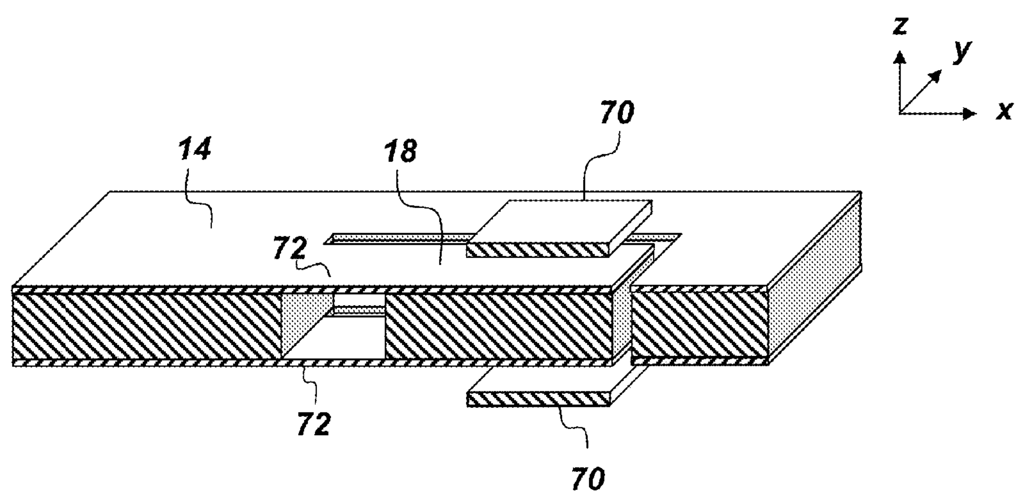
FIG. 6 is a cross-sectional view of a sense mass.

FIG. 6 shows an cross-sectional perspective view of an alternative embodiment of the first sense mass 18, which further comprises a first sense mass driver 70 configured to drive the first sense mass 18 to oscillate in the z-direction at a resonant frequency of the first sense mass 18. The first sense mass driver 70 may be any device capable of causing controlled movement of the first sense mass 18 in the z-direction with respect to the drive mass 14. Suitable examples of the first sense mass driver 70 include, but are not limited to variable area actuators, such as electrostatic comb drives, and variable gap actuators, such as parallel plate actuators, as well as other electro-magnetic or piezoelectric mechanisms of actuation. For example, the first sense mass driver 70 may comprise a symmetric pair of upper and lower overlapped capacitive electrodes on either side of the first sense mass 18, such as is depicted in FIG. 6, that can be used to create a velocity vector in the first sense mass 18. FIG. 6 also shows a way to couple the first sense mass 18 to the drive mass 14 with monolithically-integrated dual springs 72.

In embodiments of the gyroscope 10 where the first sense mass 18 is driven to oscillate and where the resonant frequency of the first sense mass 18 is substantially larger than a drive frequency of the drive mass 14 an offset modulation mode may be employed to determine displacement and amplitude information of the first sense mass 18 in the z-direction with respect to the drive mass 14. In this embodiment the sense mass(es) are capacitively "pinged" to initiate harmonic oscillation. For example, see operation of the time domain accelerometer discussed in U.S. patent application Ser. No. 13/276,948.

In embodiments of the gyroscope 10 where the resonant frequency of the first sense mass 18 is approximately equal to the drive frequency of the drive mass 14 an amplitude modulation mode may be employed to determine displacement and amplitude information of the first sense mass 18 in the z-direction with respect to the drive mass 14. In this embodiment, the sense mass(es) do not require pinging since the Coriolis forces will initiate harmonic oscillation. For example, see the open loop embodiment of a sense mass in U.S. patent application Ser. No. 13/167,539, filed 23 Jun. 2011 by Charles H. Tally et al., which is incorporated by reference herein in its entirety.

Figure 7:
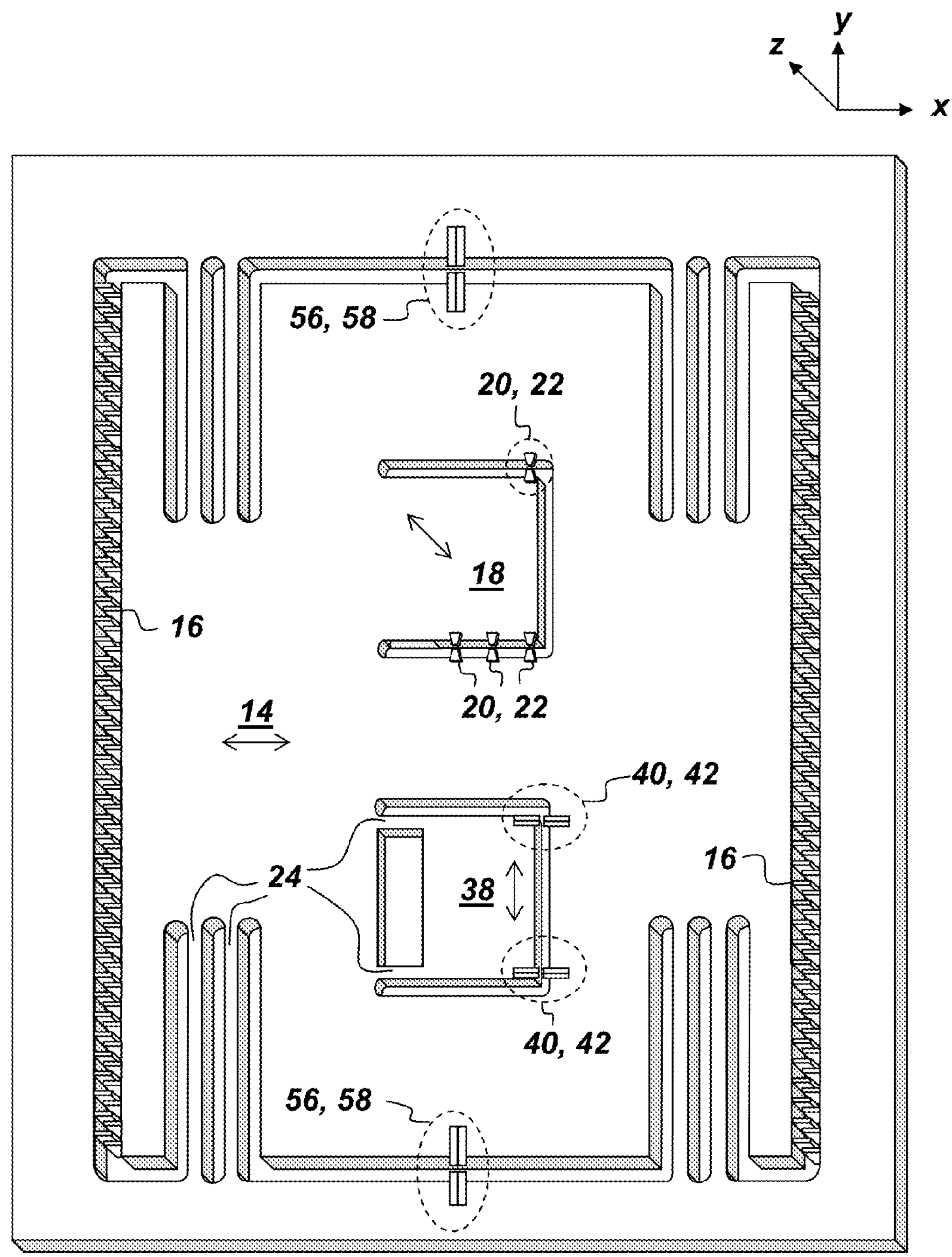
FIG. 7 is a perspective view of another dual-sense-mass embodiment of a gyroscope.

FIG. 7 shows another embodiment of the gyroscope 10 featuring multiple iterations of each of the first, second, and third proximity switches 22, 42, and 58. Multiple digital triggers/proximity switches may be used with each of the masses in the gyroscope 10.

Figure 8:
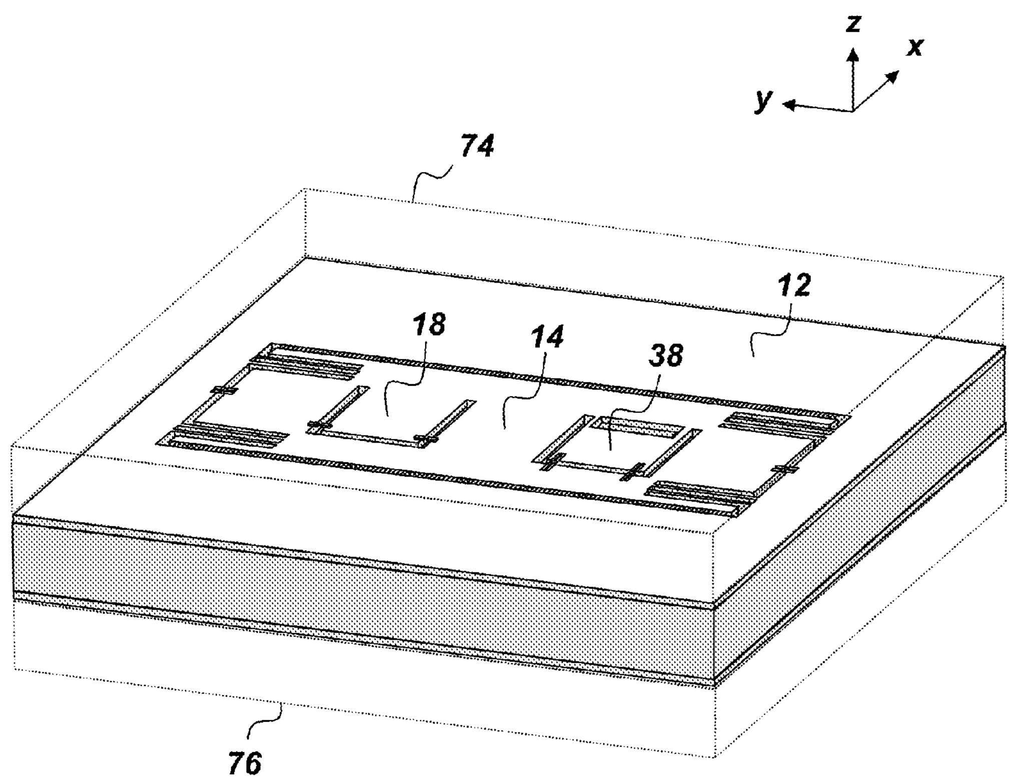
FIG. 8 is a perspective view of another dual-sense-mass embodiment of a gyroscope.

FIG. 8 is an illustration of an embodiment of the gyroscope 10 showing the support structure 12, the drive mass 14, the first sense mass 18, and the second sense mass 38 vacuum-sealed between a top cap wafer 74 and a bottom cap wafer 76. The top and bottom cap wafers 74 and 76 are depicted in FIG. 8 as transparent with dotted outlines in order to facilitate viewing of the internal features of the gyroscope 10.

From the above description of the gyroscope 10, it is manifest that various techniques may be used for implementing the concepts of gyroscope 10 without departing from its scope. The described embodiments are to be considered in all respects as illustrative and not restrictive. It should also be understood that gyroscope 10 is not limited to the particular embodiments described herein, but is capable of many embodiments without departing from the scope of the claims.

What is claimed is:

1. A gyroscope comprising:

a rigid support structure;

a drive mass springedly coupled to the support structure such that movement of the drive mass with respect to the support structure is substantially restricted to movement in a first direction;

a drive mass driver configured to cause the drive mass to oscillate with respect to the support structure in the first direction;

a first sense mass springedly coupled to the drive mass such that movement of the first sense mass with respect to the drive mass is substantially restricted to movement in a second direction, wherein the second direction is orthogonal to the first direction; and a first digital trigger comprising a first proximity switch coupled between the drive mass and the first sense mass, wherein the first switch is configured to switch from an open state to a closed state each time the first sense mass is in a first reference position with respect to the drive mass.

2. The gyroscope of claim 1, wherein the first switch is further configured to switch from an open state to a closed state each time the first sense mass is in a second reference position with respect to the drive mass.

3. The gyroscope of claim 1 further comprising:

a second sense mass springedly coupled to the drive mass such that movement of the second sense mass with respect to the drive mass is substantially restricted to movement in a third direction, wherein the third direction is orthogonal to the first and second directions; and a second digital trigger comprising a second proximity switch coupled between the drive mass and the second sense mass, wherein the second switch is configured to switch from an open state to a closed state each time the second sense mass is in a third reference position with respect to the drive mass.

4. The gyroscope of claim 3, further comprising a third digital trigger comprising a third proximity switch coupled between the drive mass and the support structure, wherein the third switch is configured to switch from an open state to a closed state each time the drive mass is in a fourth reference position with respect to the support structure.

5. The gyroscope of claim 4, wherein for each respective oscillation period, each of the first, second, and third proximity switches is configured to switch from an open state to a closed state at least twice corresponding to at least two relative positions between the two elements to which each respective switch is attached.

6. The gyroscope of claim 5, wherein the first switch comprises:

first and second electron tunneling tips mounted on the drive mass, wherein the first and second tips are aligned with each other in the second direction and separated from each other in the second direction by a distance $d_1$;

third and forth electron tunneling tips mounted to the first sense mass, wherein the third and fourth tips are aligned with each other in the second direction and separated from each other in the second direction by the distance $d_1$; and wherein the first, second, third, and fourth tips are positioned with respect to each other such that when the first sense mass is in the first reference position, a current pulse passes from the first and second tips over a gap to the third and fourth tips respectively, and such that when the first sense mass is displaced from the first reference position in the second direction by the distance $+d_1$ a current pulse passes from the second tip to the third tip, and such that when the first sense mass is displaced from the first reference position in the second direction by the distance $-d_1$ a current pulse passes from the first tip to the fourth tip.

7. The gyroscope of claim 6, wherein the second switch comprises:

fifth and sixth electron tunneling tips mounted on the drive mass, wherein the fifth and sixth tips are aligned with each other in the third direction and separated from each other in the third direction by a distance $d_2$;

seventh and eighth electron tunneling tips mounted to the second sense mass, wherein the seventh and eighth tips are aligned with each other in the third direction and separated from each other in the third direction by the distance $d_2$; and wherein the fifth, sixth, seventh, and eighth tips are positioned with respect to each other such that when the second sense mass is in the third reference position, a current pulse passes from the fifth and sixth tips over a gap to the seventh and eighth tips respectively, and such that when the second sense mass is displaced from the third reference position in the third direction by the distance $+d_2$ a current pulse passes from the sixth tip to the seventh tip, and such that when the second sense mass is displaced from the third reference position in the third direction by the distance $-d_2$ a current pulse passes from the fifth tip to the eighth tip.

8. The gyroscope of claim 7, wherein the third switch comprises:

ninth and tenth electron tunneling tips mounted on the support structure, wherein the ninth and tenth tips are aligned with each other in the first direction and separated from each other in the first direction by a distance $d_3$;

eleventh and twelfth electron tunneling tips mounted to the drive mass, wherein the eleventh and twelfth tips are aligned with each other in the first direction and separated from each other in the first direction by the distance $d_3$; and wherein the ninth, tenth, eleventh, and twelfth tips are positioned with respect to each other such that when the drive mass is in the fourth reference position with respect to the support structure, a current pulse passes from the ninth and tenth tips over a gap to the eleventh and twelfth tips respectively, and such that when the drive mass is displaced from the fourth reference position in the first direction by the distance $+d_3$ a current pulse passes from the tenth tip to the eleventh tip, and such that when the drive mass is displaced from the fourth reference position in the first direction by the distance $-d_3$ a current pulse passes from the ninth tip to the twelfth tip.

9. The gyroscope of claim 8 wherein the gyroscope is monolithically integrated.

10. The gyroscope of claim 9, wherein the support structure, the drive mass, the first sense mass, and the second sense mass are vacuum-sealed between top and bottom cap wafers.

11. The gyroscope of claim 10, wherein the drive mass driver comprises capacitive comb drives.

12. The gyroscope of claim 1, further comprising a first sense mass driver configured to drive the first sense mass to oscillate in the second direction at the resonant frequency of the first sense mass, and wherein the resonant frequency of the first sense mass is substantially larger than a drive frequency of the drive mass.

13. The gyroscope of claim 1, wherein the resonant frequency of the first sense mass is approximately equal to a drive frequency of the drive mass.

14. A monolithic gyroscope comprising:

a rigid support structure;

a drive mass springedly coupled to the support structure;

a drive mass driver configured to drive the drive mass to oscillate with respect to the support structure in approximately only an x-direction;

a first sense mass springedly coupled to the drive mass, wherein the first sense mass is configured to move with respect to the drive mass in approximately only a z-direction, which is orthogonal to the x-direction, in response to Coriolis forces from rotation of the support structure about a y-axis, which is orthogonal to both the z- and x-directions; and a first digital trigger comprising a first proximity switch coupled between the drive mass and the first sense mass configured to pass from an open state to a closed state when the first sense mass passes through a first reference position such that rotation of the support structure about the y-axis may be determined by monitoring the state of the first proximity switch with respect to time.

15. The gyroscope of claim 14, further comprising:

a second sense mass springedly coupled to the drive mass, wherein the second sense mass is configured to move with respect to the drive mass in approximately only the y-direction in response to Coriolis forces from rotation of the support structure about the z-axis; and a second digital trigger comprising a second proximity switch coupled between the drive mass and the second sense mass and configured to pass from an open state to a closed state when the second sense mass passes through a reference position with respect to the drive mass such that rotation of the support structure about the z-axis may be determined by monitoring the state of the second proximity switch.

16. The gyroscope of claim 15, further comprising a third digital trigger comprising a third proximity switch coupled between the drive mass and the support structure and configured to pass from an open state to a closed state when the drive mass passes through a third reference position such that acceleration of the support structure in the x-direction may be determined by monitoring the state of the third proximity switch.

17. The gyroscope of claim 16, wherein each of the first, second, and third switches comprises four electron tunneling electrode tips configured with respect to each other such that the first, second, and third switches pass through closed states when the drive mass, the first sense mass, and the second sense mass respectively are displaced from their respective reference positions by a distance of $\pm d_1$, $\pm d_2$, and $\pm d_3$ respectively in their respective directions of oscillation.

18. The gyroscope of claim 17, further comprising a first sense mass driver configured to drive the first sense mass to oscillate in the z-direction at the resonant frequency of the first sense mass, wherein the resonant frequency of the first sense mass is substantially larger than a drive frequency of the drive mass.

19. The gyroscope of claim 17, wherein the resonant frequency of the first sense mass is approximately equal to a drive frequency of the drive mass.

20. The gyroscope of claim 17, wherein the support structure, the drive mass, the drive mass driver, the first sense mass, and the second sense mass are vacuum-sealed between top and bottom cap wafers.

* * * * *